July 27, 1926. 1,593,971
J. E. R. HASBROUCK
GEAR SHIFT MECHANISM
Original Filed Nov. 24, 1923 5 Sheets-Sheet 1

INVENTOR
John E. R. Hasbrouck
BY Darby & Darby
HIS ATTORNEY

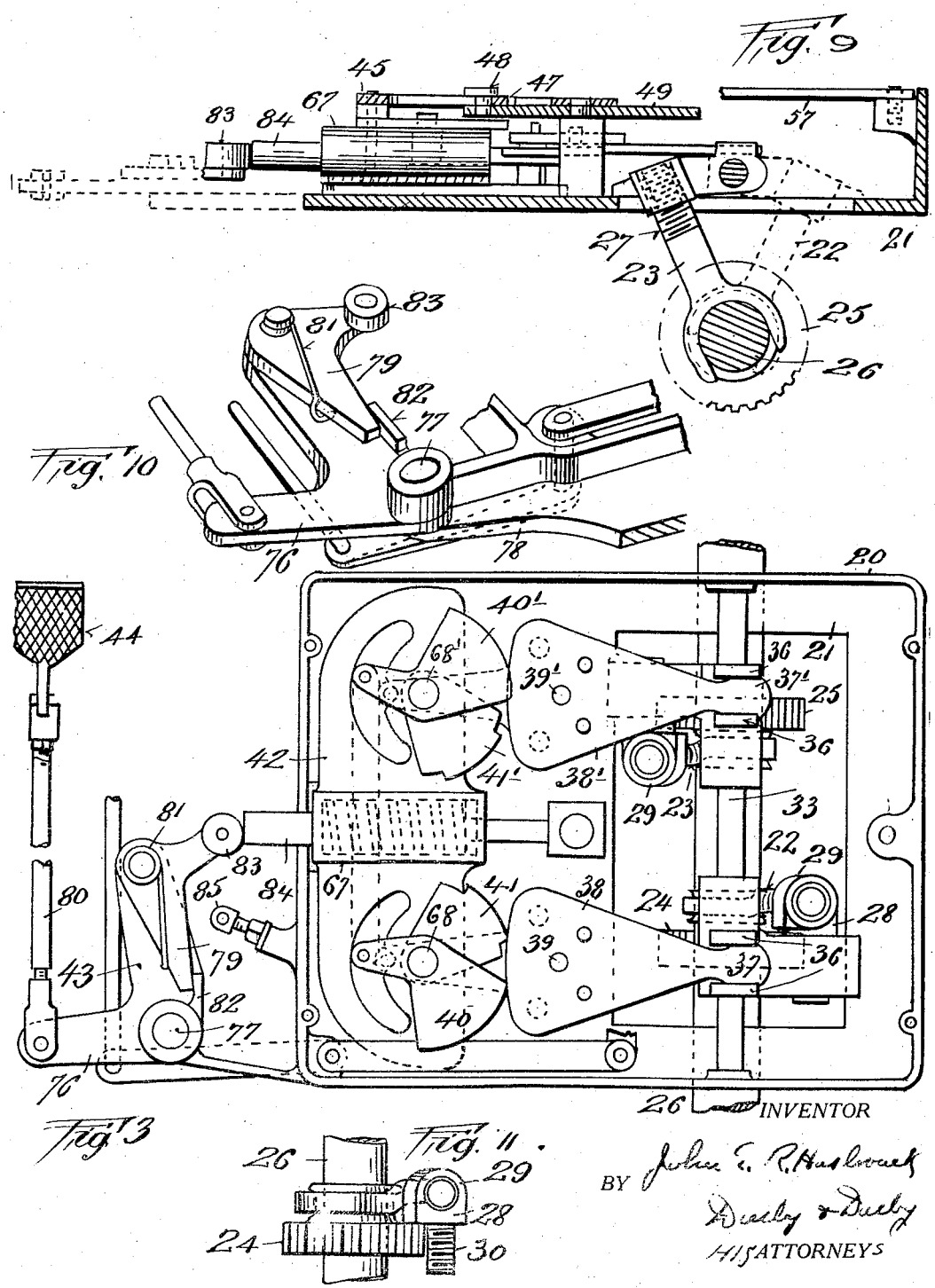

July 27, 1926.

J. E. R. HASBROUCK 1,593,971

GEAR SHIFT MECHANISM

Original Filed Nov. 24, 1923   5 Sheets-Sheet 3

INVENTOR
John E. R. Hasbrouck
BY
Dudley & Dudley
ATTORNEY

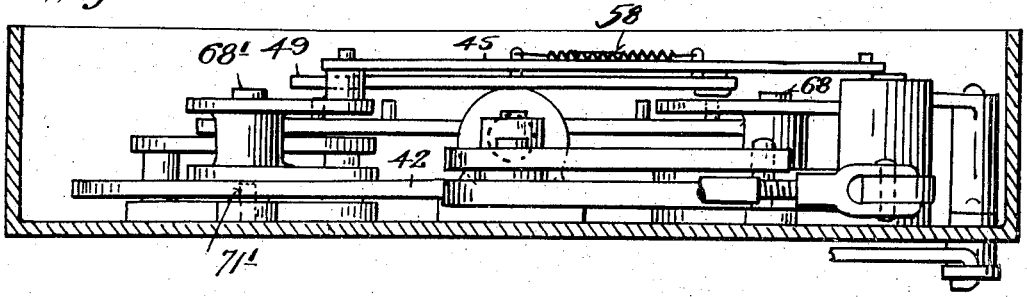
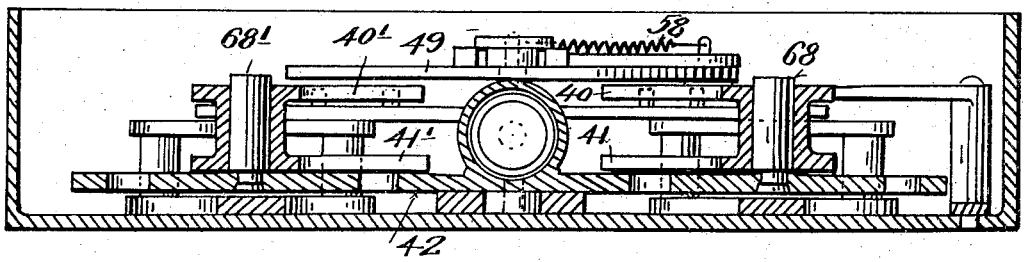
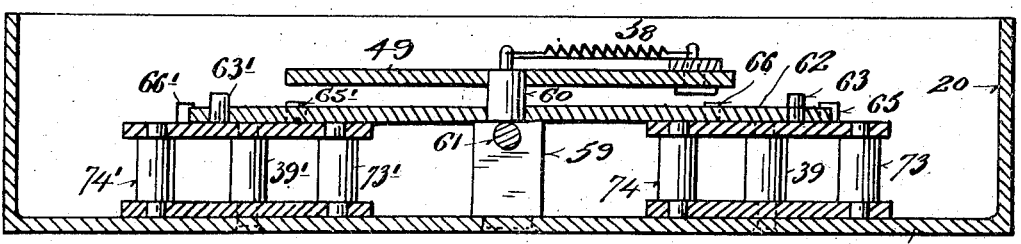
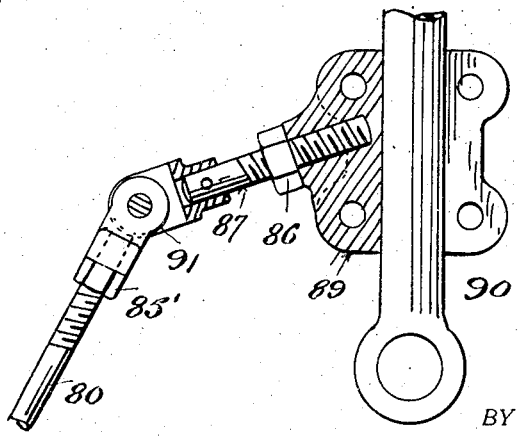

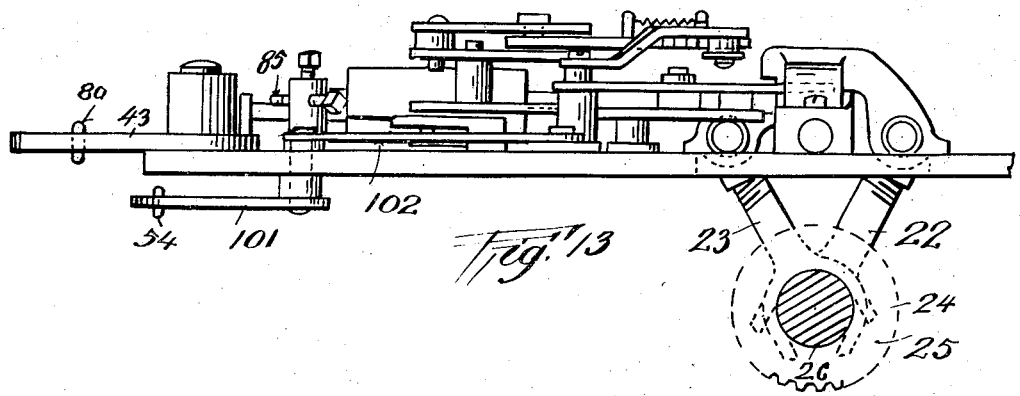
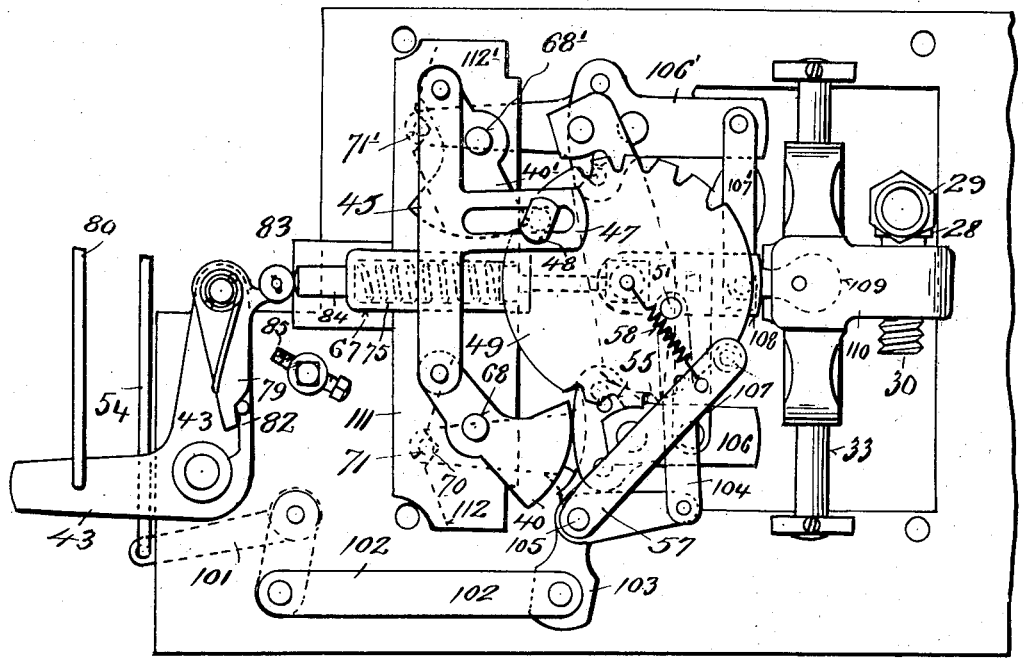

Patented July 27, 1926.

1,593,971

UNITED STATES PATENT OFFICE.

JOHN E. R. HASBROUCK, OF NEW YORK, N. Y.

GEAR-SHIFT MECHANISM.

Application filed November 24, 1923, Serial No. 676,699. Renewed June 16, 1926.

This invention relates to gear shift mechanism for selectively shifting gears in transmissions for motor vehicles, and includes in its objects the production of an assembled self-contained selector unit which is readily applied to gear sets in place of the usual hand-operated gear shift lever.

Another object of my invention includes the production of a very compact, thoroughly rugged and absolutely reliable gear shift mechanism of the type stated, which is universally applicable to lever operated gear-shift cars and which is designed and constructed to permit the desired or anticipated gear selection to be made at any time before the shift is actually made and wherein the final change in speed is preferably caused to be effected by means of the clutch pedal.

A further object includes the provision of mechanism whereby the selector means is quickly set to the anticipated speed.

Another object embraces the production of a selective gear shift mechanism which is positive and certain in action and wherein the parts are self-locking and self-lubricating.

Another object includes the provision of a shifter-fork adapter whereby proper adjustment and connection to the gear set is made.

A still further object includes the provision of a tripper mechanism.

Another object includes the provision of a mechanism which permits the cam carriage to return to normal, even though the shift is not completed, and thereby permitting a future anticipated speed to be selected.

Other objects will appear hereinafter and I attain these objects by the mechanism illustrated in the accompanying drawings, in which:—

Fig. 1 is a plan view of a construction embodying the principles of my invention. The device has been set and shifted to neutral and is now ready to be set for any other shift.

Fig. 3 is a plan view showing the shifting or operating fingers in neutral position and having the selector cams set and ready for shifting to another (the second) speed.

Fig. 6 is an end view taken from the tripper side, with the case broken away.

Fig. 8 is a sectional view taken on lines 8—8 of Fig. 1.

Fig. 9 is a view taken on a line at right angles to the views of Figs. 6, 7 and 8, and showing the relation of the plunger and tripper, as well as the position of shifter forks.

Fig. 10 is a view in perspective of the tripper device.

Fig. 11 is a view showing the fork and its adapter in relation with the main shaft and selector gear.

Fig. 12 is a plan view of a modified construction embodying my invention.

Fig. 13 is a side elevation thereof.

Fig. 15 is a detail view thereof.

Similar numerals refer to like parts throughout the several views.

Figures 2, 7, 14:
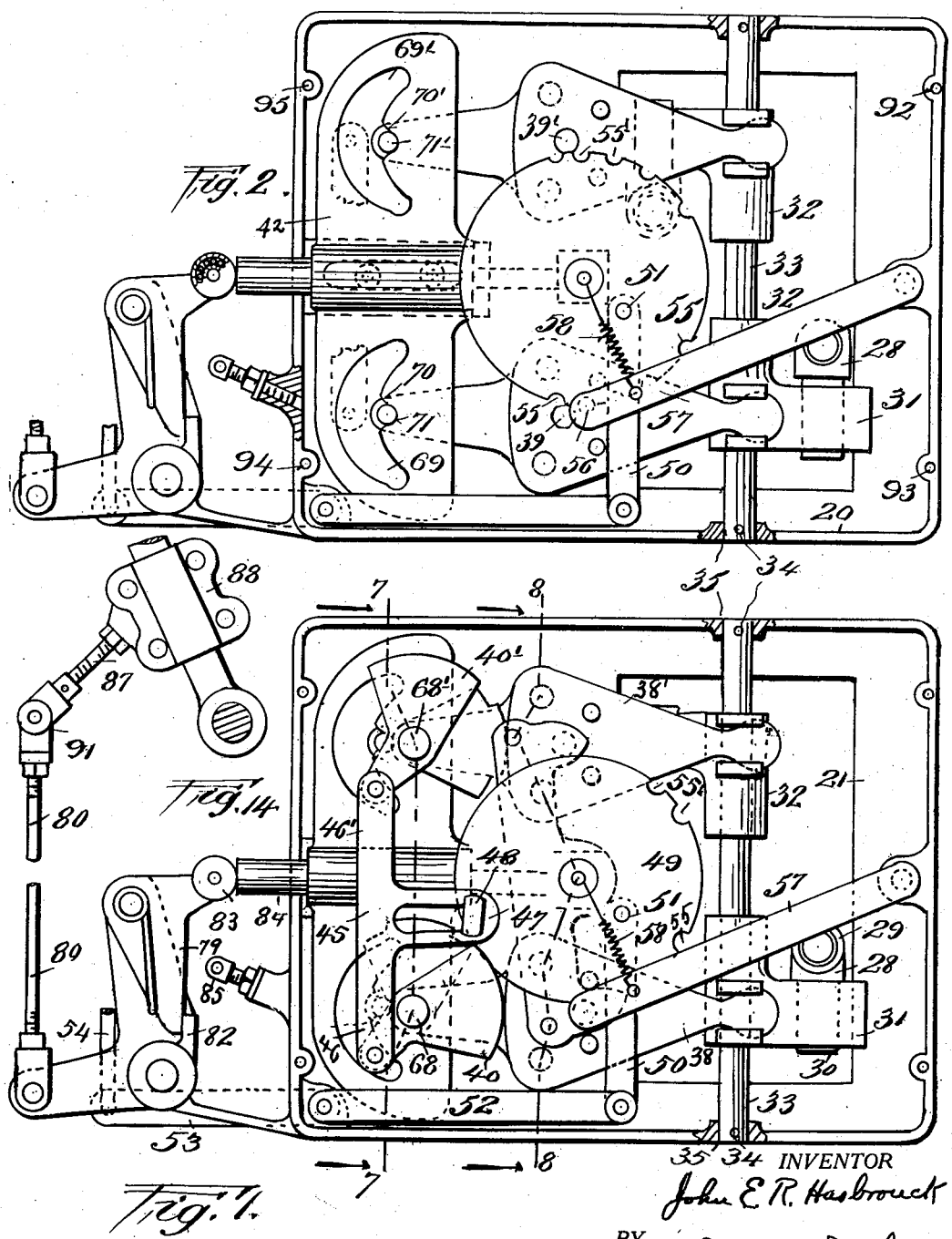
Fig. 2 is a view similar to Fig. 1, with the return and lock member, the cam members and the cam yoke removed.
Fig. 7 is a sectional view taken on lines 7—7 of Fig. 1.
Fig. 14 is a side elevation of an adjustable connector for attaching the shifting and tripping rod to the clutch pedal stem.

It is one of the prime purposes of my invention to produce a universal selector unit, that is, a selector unit which is adapted to be attached directly to any gear-set case and car and operated in place of the usual hand lever for shift gears on all cars of the selector gear shift type. To this end I have designed and constructed a very compact and rugged selector gear shift mechanism, which is conveniently enclosed in a casing and is provided with proper adjustable operating means to fit any of the standard types of cars without the necessity of readjusting or rearranging the standard parts thereof.

As a practical embodiment of my invention, I provide a casing 20 having an open floor 21 through which the gear shifting forks 22 and 23 operate to move the selector gears 24 or 25 along the gear shaft or drive journal 26 of the gear set to which the selector unit is applied. In order to fit all the standard makes of gear sets and cars, I provide the shifting forks with a screw-threaded stem 27 which is received in the fork adapter 28 and can be adjusted therein to the proper length. The fork adapter comprises a head 29, (which is screw-threaded to receive the aforesaid fork stem), and a screw-threaded stem 30, of any desired length, to provide for the various locations and combinations of the gears in any particular gear set to which my shift mechanism is applied. The threaded stem 30 is received in extension 31 of the barrel adapter fork shifter 32, which slides on journal 33 in response to the operation of the selective shifting mechanism. The barrel adapter journal 33 is secured by suitable pins 34 in bores 35 of the side walls of the casing 20. The fork shifter barrel adapter 32 is also provided with lugs 36 for engaging the heads 37, 37' of the shifting or operating fingers 38, 38'.

The shifter fingers are pivotally mounted on center pins 39, 39' for operation by their respective selector cam members 41, 41', as will be more fully stated below. These cam members may be termed the "lower" cam members and are integrally united to the "upper" selector cam members 40, 40' and oscillate in unison therewith about their respective pivot pins 68, 68' on the cam carriage 42, as said carriage is depressed and released after the manner to be stated more fully below, and as is indicated in Figs. 1, 4 and 5.

The selector cams described above are set or moved for the desired speed gear by my selector device, which comprises a selector yoke 45 having arms 46, 46' to which are pivotally united the selector cam members. A slotted extension 47 of the selector yoke 45 engages a knob 48 on the selector disc 49, which disc is set and operated by a link 50 attached at one end to a pivot 51 on the disc and at the other to an extension link 52. This extension may be operated in any desired manner, as by a lever 53, which is preferably operated through linkage 54 from a suitable control on the steering wheel, as is fully described in my co-pending application of even date herewith. To indicate to the operator the proper position of the selector disc and to hold the same at the selected position, I provide said disc with a plurality of notches 55, 55' into which notches the locating knob 56 on lever 57 is adapted to be held by a tensioning spring 58. These notches are properly spaced and locate reverse, neutral, first, second and full speeds, or other additional speeds if necessary, for notches 55, and the reverse order if the holding lever 57 is switched onto notches 55', as is done to accommodate the reverse order of the selector gears in the gear set to which the device is applied.

Figure 5:
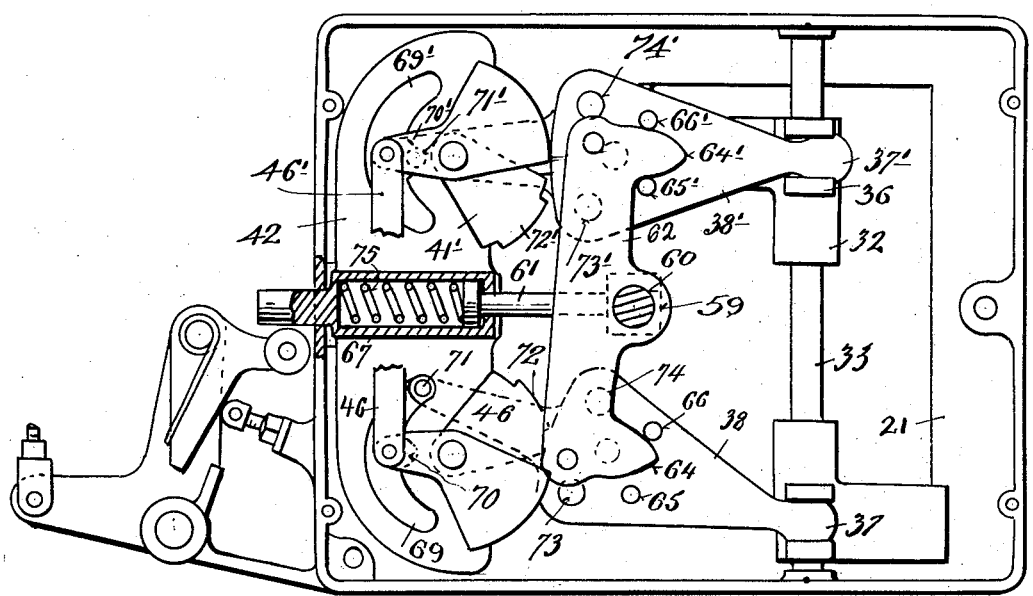
Fig. 5 is a view similar to Fig. 4, with the cam carriage returned and gear locked in mesh. The mechanism is ready for any other speed selection to be made.
Figure 4:
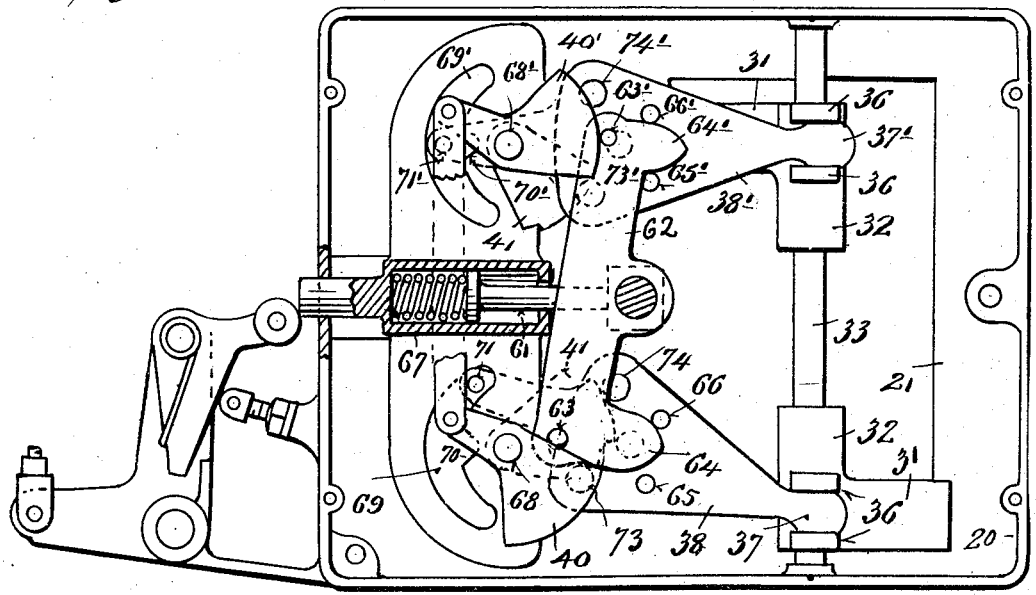
Fig. 4 is a view showing one of the shifting or operating fingers locked and the other shifted. The tripping mechanism is ready to trip and permit the cam carriage to return to normal.

As will be best observed from Figs. 8, 4 and 5, the floor 21 of casing 20 has secured thereto a centrally located operating post 59 which is preferably square at its lower portion and supplied with a round upper end 60. Secured to the square portion and extending therefrom at approximately right angles is the carriage return spring compressing plunger 61 for the purpose to be described hereinafter. Immediately above this plunger and on the rounded portion 60 of the operating post, there is pivotally mounted a finger lock and return lever 62 of the Geneva type. This lever is provided with operating pins 63, 63' and with cam heads 64 and 64' for causing the shifting fingers to be individually and selectively shifted to neutral positions, and to be locked and retained in said previously shifted positions. Each shifting finger is provided with spaced projecting locking pins 65, 66, and 65', 66', between which the respective cam heads 64, 64' are adapted to fit, for holding (or returning) the corresponding finger. These pins serve as holding and locking pins when one of the cam heads of the Geneva lever is depressed therebetween by the corresponding adjacent upper cam engaging the operating pin on said lever head. While one of the fingers is thus locked and held, the other is free to move in response to a selection made and by means of the opposing "lower" cam surface engaging with one of the lower operating pins of said finger, thereby shifts the finger to the selected position. Such a condition is shown in Fig. 4. If, now, another selection is made and the cam carriage is again depressed, the Geneva lever will rock and the opposite cam head surface will engage a locking pin for returning the finger to its new position, as will be more fully described below.

The cam carriage 42 comprises a substantially flat bar which is provided with a centrally located tripper block 67 integrally attached thereto and with laterally located cam pivot pins 68 and 68' on which the selector cam members oscillate in response to the movement of the selector yoke. The cam carriage bar is also provided with arc-shaped slot members 69, 69' immediately adjacent the position of the pivot pins 68 and 68'. These slots provide lock seats at either extremity and at the centrally located notch 70 or 70' into which the tail studs 71, 71' of the respective shifting fingers are adapted to engage for locking each finger in its selected position. It will be observed that the cam carriage bar rests on the tail pieces of the shifting fingers and slides thereon, and that the pivot pins 68, 68' are fastened into the said cam bar. It is further also noted that the cam surface of the lower cam members 41, 41' are notched near the extremities of their arc cam surfaces 72, 72'.

The arc cam surface of each cam 72, 72' is adapted to engage the corresponding lower finger shifting pins 73, 74, or 73', 74', of the shifting fingers 38, 38' in accordance with the shift selected before the cam carriage is depressed and the actual shift is made through the tripper mechanism, whereby the carriage return tripper block spring 75 is compressed against the fixed or stationary plunger 61, in the manner illustrated, for example, in Fig. 4.

The tripper mechanism 43 comprises an operating bell crank 76, which is pivotally mounted on a pin 77. This pin is carried on an arm extension 78 of the casing. A tripper bell crank 79 is pivotally mounted near the extremity of one of the arms of crank 76 and a clutch operated link 80 is similarly mounted on the other arm. One arm of the tripper bell crank is depressed by a spring 81 against a stop block 82 on the operating crank, and the other arm carries a suitable member as a friction roller or ball-bearing contact point 83 which engages the pin projection 84 for moving against and across its end as the operating bell crank is depressed and as the spring pressed arm of the tripper bell crank engages the adjustable contact point 85, thereby causing said tripper to disengage the tripper block pin, and permitting the carriage to return to normal position for future selections to be made. For quick attachment and ready adjustment, and in order to fit the variously designed clutch pedals, I have devised a link attachment illustrated in Figs. 14 and 15, whereby the link 80 is readily adjusted in length by the usual take up nuts 85' and 86 on links 80 and 87 respectively. Link 87 is fitted into the anchor 88 which comprises two anchor members, one of which, member 89, is shown in Fig. 15. These anchor members fit tightly over the pedal arm 90 and permit quick adjustment to any proper position, as may be required. A toggle joint 91 permits easy operation of the pedal for operating the tripper mechanism, in the manner stated above.

If, for example, the shifting fingers are at neutral, as indicated in Figs. 1, 2 or 3, they are positively locked in this position for the reason that the tail studs at the end of the shifting fingers are engaged and held in the lock seats 70 or 70' of slots 69 or 69'. In this position the Geneva lock and return lever is free to be tilted in either direction, depending upon the shift selected. If the selector disc 49 is now rocked for, say, the second speed, as is indicated in Fig. 3, and thereafter the clutch is depressed, the cam carriage will be depressed through the tripper mechanism and tripper block. Cam 40' will engage operating pin 63' on what is now the locker end of the Geneva lever and cause the cam head 64' to engage pins 65' and 66' to thus lock finger 38' in position. In the meanwhile, finger 38 is being rocked by the lower cam 41 engaging pin 74, as shown in Fig. 4. The tripper mechanism is now ready to trip so as to permit the cam carriage to return to normal in the manner illustrated by Fig. 5. In this figure the cam carriage has returned and any other new selection may now be made. The tail lock stud 71 and its finger 38 are now locked in position holding the gears controlled by said finger 38 in mesh, while the companion tail lock stud 71' on finger 38' holds the opposite of gears in a disengaged position. The trip mechanism has now tripped, permitting any future gear selection to be made. But, obviously no shift can be made from this position until after the pressure has been taken from the clutch pedal to permit the tripper to return to its normal position.

It should be also noted that cam head 64 of the Geneva lever will now act as a return member for returning finger 38 back to either normal or to a new shift position. This is accomplished by one of the cam surfaces of head 64 acting on pin 66 which serves now as a return member. Obviously, when finger 38 is shifted to the opposite extreme position, pin 65 will serve as the return pin, and both pins become lock pins when the finger rests at normal, as has just been described for finger 38' and the corresponding lock pins 65' and 66'. It is also apparent that with the proper shifts, lock pins 65' and 66' become, individually, return members, as did 65 or 66, so that the pins become lock members acting in pairs, or they become, individually, return members, depending upon the position or motion of the Geneva lock and return lever.

In the form shown in Figs. 12 and 13, the tripper mechanism and mode of gear selection are identical. The selector disc 49 is rocked by shifting the hand lever 54, as in my preferred form. Motion is transmitted through a bell crank lever 101 to a short link 102, then to a second bell crank lever 103 to link 104 which is pivotally held on the selector disc by the pivot pin 51. The disc holding and positioning lever 57 operates as in my preferred construction, but this lever is supported from the side pivot 105 on which the bell crank lever 103 also rocks, and therefore is less flexible for adjustment. The gear shift is made from either shifting finger 106 or 106' operating through links 107 or 107' to move the adapter arm 108, of which the head 109 engages the barrel adapter 110 sliding on journal 33. The cam carriage 111 carries a lock piece 112 or 112' at either end for engaging and seating the finger tail lock stud 71 or 71'.

The entire shifting mechanism within the casing 20 is protected by a cover plate (not shown) which protects the mechanism from dust and dirt. The location of the mechanism, is directly over the gear set, and is held in place by screws (not shown) which fit in the regular screw holes of the gear set. The screw holes 92, 93, 94 and 95 hold tightly the cover (not shown), thereby making the device oil tight so as to be self-lubricating by oil splashing from the gear set on to the shifting mechanism. The ruggedness of the parts which compose the mechanism makes it thoroughly reliable and certain of action, and when once installed requires no special attention. In practice, I make the screw stems of the forks and of their adapters of proper length to permit adjustment on any of the standard gear sets having the selector type of transmission. These stems may be adjusted and then cut at the proper length for the particular transmission, so that in this respect my device is also universal and admits of quick attachment. It will be also observed that the use of my tripper device endows my mechanism with the greatly desired degree of flexibility for making future selection for anticipated speeds under greatly varying conditions of operation, whether the motor is used as a source of power for accelerating or retarding, or even holding constant, the motion of the car which is equipped with my device. It is further to be understood that while I have described detailed and specific constructions for embodying the principles of my invention, I do not thereby desire to be understood as unduly limiting myself, for various modifications falling wholly within the spirit and scope of my invention will suggest themselves to those versed in the art.

What I claim, therefore, as new and useful, of my own invention, and desire to secure by Letters Patent is:—

1. In a gear shift mechanism for selectively shifting gears in a gear set, means for engaging said gears, operating members for moving said engaging means independently, means for locking said operating members in different shift positions, a return and holding device for positioning said members in response to the shift selected, a tripper mechanism for effecting the selected shift, means for selecting any anticipated shift and means coacting with said tripper mechanism for actuating the gear shifting levers.

2. In a gear shift mechanism for selectively shifting gears in a gear set, means for engaging said gears, operating members for independently moving said engaging means, an oscillating lever mounted to act on either of said operating members for returning or for holding said member at neutral, means including cam members for selecting the anticipated shift, a cam carriage for said cam members, and tripper device operating with said selector means to shift either of said operator members in response to the shift selected.

3. In a gear shift mechanism for selectively shifting gears, means for engaging said gears, connector members for said gear engaging means, a pair of gear shifting fingers mounted to oscillate in a common plane and engaging said connector members, projections on said fingers, a cam carriage mounted to reciprocate in a plane parallel to the plane of oscillation for the shifting fingers, a plurality of cam members mounted on said cam carriage, means to selectively oscillate said cam members in unison prior to the reciprocation of said cam carriage to thereby position said cam surfaces for selectively engaging said finger projections.

4. In a gear shift mechanism for selectively shifting gears, means for engaging said gears, connector members for said gear engaging means, gear shifting fingers mounted to oscillate in a common plane and engaging said connector members, projections on said fingers, a cam carriage mounted to reciprocate in a plane parallel to the plane of oscillation for the shifting fingers, a plurality of cam members mounted on said cam carriage, means to selectively oscillate said cam members in unison prior to the reciprocation of said cam carriage to thereby position said cam surfaces for selectively engaging said finger projections, and tripper mechanism for reciprocating said cam carriage.

5. In a gear shift mechanism for selectively shifting gears in a gear set, means for engaging said gears, operating members for independently moving said engaging means, an oscillating lever mounted to act on either of said operating members for returning or for holding said members at neutral, means including cam members for selecting the anticipated shift, a cam carriage for oscillating either of said operating members, a clutch operated member for depressing said cam carriage to thereby cause to oscillate the selected operating member, and means for releasing the cam carriage prior to releasing the clutch whereby the selector member is again rendered available for future shifts.

6. In a gear shift mechanism for selectively shifting gears, means for engaging said gears, operating members for causing said gear engaging means to move independently, a plurality of interlocked cam members for selectively causing said operating members to oscillate, means for moving said cam members into predetermined positions in accordance with the speed shift selected, a cam carriage for rendering effective said cam members in accordance with their selected positions, a clutch operated member for depressing said cam carriage to effect the selected speed change, and means for releasing said cam carriage prior to releasing the clutch whereby the cam members are available for future selection.

7. The combination, in a selective gear shift mechanism, a selector device including a disc, a control lever connected to said disc, a yoke pivotally connected to said disc opposite said lever connection, interlocked selector cams controlled by said yoke and lever, shifting fingers adapted to be selectively moved by said cams in accordance with the position of the selector cams, a cam carriage carrying said selector cams, and foot operated shifting mechanism for depressing said cam carriage to effect the anticipated shift.

8. The combination, in a selective gear shift mechanism, a selector device including a disc, a control lever connected to said disc, a yoke pivotally connected to said disc opposite said lever connection, interlocked selector cams controlled by said yoke and lever, shifting fingers adapted to be selectively moved by said cams in accordance with the position of the selector cams, a cam carriage carrying said selector cams, foot operated shifting mechanism for depressing said cam carriage to effect the anticipated shift, and means for releasing said cam carriage while the foot operated mechanism is depressed to thereby render available the selector device for future anticipated shifts.

9. The combination, in a selective gear shift mechanism, a selector device including a disc, a control lever connected to said disc, a yoke pivotally connected to said disc opposite said lever connection, interlocked selector cams controlled by said yoke and lever, whereby anticipated shifts are selected prior to making the actual shift, a pair of shifting fingers mounted to oscillate in the same plane, tail locks on said fingers for locking the same in position, pins on said fingers for engaging said cams to cause said fingers to assume their relatively selected shifted or locked positions, a tripper member for effecting the shift, and means for disengaging the effective portion of said tripper member without retracting the tripper member.

10. A tripper member for a selective gear shift, comprising a pivotally mounted arm having a pivot-bearing near the end thereof and a second arm mounted on said pivot-bearing, a depressible member, said second arm having a contact member for engaging said depressible member, a fixed member for causing the contact member to disengage said depressible member as the pivotally mounted arm member continues to move in the same direction about its pivot.

11. A tripper member for a selective gear shift, comprising an L-member pivotally mounted to permit the limbs of said member to describe concentric arcs, a pivot-bearing on one of said limbs, a bell-crank member mounted on said pivot-bearing to move on one of said arcs, a contact-member on one arm of said bell-crank, said contact-member also moving in an arc struck from the pivot point of the L-member, and means for deflecting the contact member from the path of its original arc.

12. A tripper member for a selective gear shift, comprising an L-member pivotally mounted to permit the limbs of said member to describe concentric arcs, a pivot-bearing on one of said limbs, a bell-crank member mounted on said pivot-bearing to move on one of said arcs, a contact-member on one arm of said bell-crank, said contact-member also moving in an arc struck from the pivot point of the L-member, means for deflecting the contact member from the path of its original arc, and a clutch member for moving said pivotally mounted arm.

13. A tripper member for a selective gear shift, comprising an L-member pivotally mounted to permit the limbs of said member to describe concentric arcs, a pivot-bearing on one of said limbs, a bell-crank member mounted on said pivot-bearing to move on one of said arcs, a contact-member on one arm of said bell-crank, said contact-member also moving in an arc struck from the pivot point of the L-member, means for deflecting the contact member from the path of its original arc, a clutch member for moving said pivotally mounted arm, and adjustable means for attaching said clutch member to the clutch pedal arm.

14. In a selector gear shift mechanism for gear sets, a selector disc having indicator notches in its periphery at substantially opposite sides, means for moving said disc, selector cams controlled by the movement of said disc, shifting fingers controlled by said cams to selectively shift selector gears in said gear set, means for effecting said selective shift, and means for permitting new speed selections to be made at any time prior to effecting the actual shift.

15. In a selector gear shift mechanism for gear sets, a selector disc having indicator notches in its periphery at substantially opposite sides, locating and holding means mounted to register with either of said oppositely located indicator notches, means for moving said disc, selector cams controlled by the movement of said disc, shifting fingers controlled by said cams to selectively shift selector gears in said gear set, means for effecting said selective shift, and means for permitting new speed selections to be made at any time prior to effecting the actual shift.

16. In a selector gear shift mechanism for gear sets, a selector disc having indicator notches in its periphery at substantially opposite sides, means for moving said disc, selector cams controlled by the movement of said disc, shifting fingers controlled by said cams, projections on said fingers, a rocking lever mounted to selectively engage said projections to thereby readjust one of said fingers while locking the other of said fingers, and a compound tripper mechanism for effecting said shift.

17. In a selector gear shift mechanism for gear sets, a selector disc having indicator notches in its periphery at substantially opposite sides, means for moving said disc, selector cams controlled by the movement of said disc, shifting fingers controlled by said cams, projections on said fingers, a rocking lever mounted to selectively engage said projections to thereby readjust one of said fingers while locking the other of said fingers, adjustable fork engaging means attached to said shifting fingers whereby said selector gear shift mechanism is adapted to be attached to gear sets having varying gear relations and with the selector gears differently located.

18. In a selector gear shift mechanism for gear sets, a selector disc having indicator notches in its periphery at substantially oppositely sides, locating and holding means mounted to register with either of said oppositely located indicator notches, means for moving said disc, selector cams controlled by the movement of said disc, shifting fingers controlled by said cams, shifter fork adapters including a barrel adapter and extensible fork holders attached to said fingers, and means for operating said fingers in accordance with the shift selected.

19. In a universal selector gear shift mechanism for a gear set, adjustable means for engaging the selector gears in said gear set, shifter fingers oscillating in the same plane for shifting said gears, an oscillating lever associated with said shifter fingers for resetting one of said fingers and locking the other, cam members for selectively oscillating either of said fingers, means for selectively causing said cam members to become effective when the clutch lever is depressed, and means for permitting new speed selections to be made before the clutch lever is released from its depressed position.

20. In a universal selector gear shift mechanism for a gear set, adjustable means for engaging the selector gears in said gear set, shifter fingers engaging said adjustable means, interlocked cam members for selectively causing said shifter fingers to operate, selector means for setting said cams, and a cam carriage reciprocating in substantially the same plane with that in which the shifter fingers move to effect the shift in accordance with the selection made, and a casing for enclosing the gear shift mechanism.

21. In a universally applicable gear shift mechanism for gear sets, a casing having an open panel in the bottom thereof, a selective gear shift device in said casing, adjustable gear fork holders operating at said opening, an operating plunger projecting from one side of said casing to effect shifting of the gear fork holders in response to the position of the selector gear shifting device, an arm on said casing, and a tripper mechanism on said arm to slidably move said plunger as the same is depressed to permit the plunger to return independently of the tripper.

22. In a universally applicable gear shift mechanism for gear sets, a casing having an open panel in the bottom thereof, a selective gear shift device in said casing, adjustable gear fork holders operating at said opening, an operating plunger projecting from one side of said casing for causing the gear shifting fork holders to shift in response to the position of the selector gear shifting device, an arm on said casing, a tripper mechanism on said arm to slidably move said plunger as the same is depressed to permit the plunger to return independently of the tripper, and means for attaching said casing directly onto a gear set casing for operating said gear set.

In testimony whereof I have hereunto set my hand on this 19th day of November, A. D. 1923.

JOHN E. R. HASBROUCK.